United States Patent
Tomosada

(10) Patent No.: US 7,329,376 B2
(45) Date of Patent: Feb. 12, 2008

(54) METHOD OF MAKING A GOLF BALL

(75) Inventor: Manabu Tomosada, Kobe (JP)

(73) Assignee: SRI Sports Ltd., Kobe-shi (JP)

( * ) Notice: Subject to any disclaimer, the term of this patent is extended or adjusted under 35 U.S.C. 154(b) by 297 days.

(21) Appl. No.: 11/187,945

(22) Filed: Jul. 25, 2005

(65) Prior Publication Data

US 2006/0033235 A1    Feb. 16, 2006

(30) Foreign Application Priority Data

Aug. 10, 2004    (JP)    ............... 2004-233020

(51) Int. Cl.
*B29C 45/00*    (2006.01)
*B29C 43/00*    (2006.01)

(52) U.S. Cl. .................... 264/250; 264/328.1; 264/325

(58) Field of Classification Search ...................... None
See application file for complete search history.

(56) References Cited

U.S. PATENT DOCUMENTS

2004/0094857 A1*   5/2004   Ito et al. ................... 264/46.7

FOREIGN PATENT DOCUMENTS

| JP | 57-78875 A | 5/1982 |
|---|---|---|
| JP | 05-318491 A | 12/1993 |
| JP | 06-344353 A | 12/1994 |
| JP | 11-169487 A | 6/1999 |

* cited by examiner

*Primary Examiner*—Edmund H. Lee
(74) *Attorney, Agent, or Firm*—Birch, Stewart, Kolasch & Birch, LLP

(57) ABSTRACT

A method of making a golf ball including a core and a cover, and having good workability and excellent productivity includes the steps of clamping a half mold having a semi-spherical cavity and a male plug mold having a semi-spherical convex, followed by injection molding fluoroplastic from an inlet vent through a runner to form a fluoroplastic thin film on the surface of the half mold, incorporating a pair of the two half molds having the fluoroplastic thin film, which is composed of an upper mold and a lower mold, into a core mold, placing a core composition in the cavity, press molding the core composition in the core mold through the fluoroplastic thin film to form a spherical core, and covering the core with a cover.

4 Claims, 1 Drawing Sheet

METHOD OF MAKING A GOLF BALL

FIELD OF THE INVENTION

The present invention relates to a method of making a golf ball. More particularly, it relates to a method of making a golf ball having good workability and excellent productivity.

BACKGROUND OF THE INVENTION

In golf balls commercially selling, there are solid golf balls and thread wound golf balls. The solid golf ball consists of a core and a cover covering the core. The core may have single-layered structure or multi-layered structure, which has two or more layers. The core is basically formed from rubber material, and can be obtained by vulcanizing and molding rubber composition comprising high-cis polybutadiene, metal salt of α, β-ethylenically unsaturated carboxylic acid (such as zinc acrylate, zinc methacrylate, etc.), peroxide crosslinking agent and the other additives. However, it has been a problem for the resulting molded article to have very poor mold releasability.

In order to improve the mold releasability, many methods of making a golf ball have been suggested in view of the mold and molded article described as follows.

(1) A release agent is sprayed or baked on the surface of a cavity of the mold for molding the core (Japanese Patent Kokai Publication No. 344353/1994).

(2) A release agent is previously dip coated on the surface of a core premolded article (Japanese Patent Kokai Publication No. 344353/1994).

(3) A release agent is previously incorporated in the core premolded article (Japanese Patent Kokai Publication No. 78875/1982).

(4) The mold for molding the core is surface treated with a release agent (Japanese Patent Kokai Publication No. 318491/1993).

(5) The core is molded in the mold through polyester film (Japanese Patent Kokai Publication No. 169487/1999) formed from integrally molded rubber material and a thermoplastic resin cover (e.g. ionomer resin cover) formed on the core.

In Japanese Patent Kokai Publication No. 344353/1994, a release agent for golf a ball comprising a polyfluorocarbon group containing phosphonic acid represented by the following general formula:

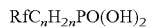

$Rf C_n H_{2n} PO(OH)_2$ wherein Rf is a polyfluorocarbon group having 3 to 8 carbon atoms and n is 1 to 3, or salt thereof, and silicone oil or wax dissolved or dispersed in organic solvent or aqueous solvent is disclosed.

In Japanese Patent Kokai Publication No. 78875/1982, a rubber composition comprising 10 to 60 parts by weight of metal salt of unsaturated carboxylic acid and 0.3 to 0.5 parts by weight of white factice, based on 100 parts by weight of base rubber is disclosed.

In Japanese Patent Kokai Publication No. 318491/1993, a method of making a golf ball comprising the steps of:

providing a molding material for the golf ball in a cavity of a mold for molding the golf ball, which solvent soluble fluoroplastic coating is formed on the surface of the cavity, and compression molding or injection molding the molding material is disclosed.

In Japanese Patent Kokai Publication No. 169487/1999, a method of making a golf ball comprising a core and a cover covering the core, the method comprising the steps of:

(a) preparing a core composition, (b) placing polyester film in a cavity of a mold for molding the core such that the film adapts to the shape of the cavity, (c) vulcanizing the core composition in the mold through the polyester film to form the core, and (d) forming the cover on the core is disclosed.

The method (1) has been generally used, but it has been a problem to have poor productivity, because defective products are caused by the contamination of the release agent in the molded article, or it is needed to clean and remove the release agent which sticks to the molded article and to periodically clean the release agent deposited on the mold, or it has been needed to spray the release agent after every pressing or after pressing several times.

In the methods (2) and (3), it has been a problem that defective products are caused by the contamination of the release agent in the molded article, or it is needed to clean and remove the release agent which sticks to the molded article, as described in the method (1).

In the method (4), there has been, for example, a method by using fluoroplastic coating as a releasing treatment of the surface of the mold, but it has been a problem as follows.

(i) The surface of the mold is roughened by blasting treatment with a blast media, such as alumina, in order to improve the adhesion of the releasing layer to the surface of the mold, but the accuracy of the mold is degraded by repeated blasting treatment every coating step of the releasing layer.

(ii) The durability of the releasing layer itself to the heat and pressure during molding the core is poor, and the releasability can not be maintained for several weeks. Therefore, the manufacturing cost is increased.

(iii) In case of removing the decomposed releasing layer and treating it again as described above, since fluoroplastic is insoluble in solvent and is not removed by the solvent, a physical method such as a blasting treatment is needed, and the removing step costs much time.

(iv) In order to reduce the removing step time, there is a method of putting the mold in a furnace at not less than 400° C. to decompose and carbonize the releasing layer, but corrosive fluorine gas generates, or the mold life is reduced by high temperature treatment.

(v) There is not only the above fluoroplastic coating method, but also a method of applying a solvent soluble fluoroplastic coating (Japanese Patent Kokai Publication No. 318491/1993). However, the durability is poor as compared with expensive material cost, and the manufacturing cost is increased, which affects the profitability.

(vi) Since the baking step is conducted at the temperature of 350 to 400° C., which is not less than the melting point of the fluoroplastic, relaxation of residual stress during processing the cavity occurs, and the cavity may be deformed.

In the method (5), the continuous use temperature of the polyester resin is low, and it has been problem that the durability of the sheet is poor.

OBJECTS OF THE INVENTION

A main object of the present invention is to provide a method of making a golf ball. More particularly, it relates to a method of making a golf ball having good workability and excellent productivity.

According to the present invention, the object described above has been accomplished by providing a method of making a golf ball comprising a core and a cover covering the core, previously forming a fluoroplastic thin film on the surface of the core half mold having a semi-spherical cavity, and press molding a core composition under applied heat in the core mold through the fluoroplastic thin film to form a spherical core, thereby providing a method of making a golf ball having good workability and excellent productivity.

This object as well as other objects and advantages of the present invention will become apparent to those skilled in the art from the following description with reference to the accompanying drawing.

BRIEF EXPLANATION OF DRAWINGS

The present invention will become more fully understood from the detailed description given herein below and the accompanying drawing which is given by way of illustration only, and thus are not limitative of the present invention, and wherein.

SUMMARY OF THE INVENTION

The present invention relates to a method of making a golf ball comprising a core and a cover covering the core, the method comprising the steps of:
(a) (i) clamping a half mold having a semi-spherical cavity and a male plug mold having a semi-spherical convex, followed by injection molding fluoroplastic from an inlet vent at the back of the half mold through a runner to form a fluoroplastic thin film on the surface of the half mold,
(ii) incorporating a pair of the two half molds having the fluoroplastic thin film, which is composed of an upper mold and a lower mold, into a core mold,
(iii) placing a core composition in the cavity,
(iv) press molding the core composition in the core mold through the fluoroplastic thin film to form a spherical core, and
(b) covering the core with a cover.

In order to put the present invention into a more suitable practical application, it is preferable that
the fluoroplastic be polytetrafluoroethylene and/or the derivative thereof;
the runner have a constriction and the half mold have an anchor hole for the fluoroplastic thin film on the surface thereof in order to prevent the fluoroplastic thin film from coming off the half mold in the step (a); and
the fluoroplastic thin film have a thickness of 0.01 to 3.00 mm.

In the method of making the golf ball of the present invention, by previously forming a fluoroplastic thin film on the surface of the core half mold having a semi-spherical cavity, and press molding a core composition under applied heat in the core mold through the fluoroplastic thin film to form a spherical core:
the productivity can be remarkably improved, because it is not needed to detach the mold during coating, baking and removing steps as described in case of using the fluoroplastic thin film;
it is possible to largely reduce defective products caused by the release agent, because there is no contamination of the release agent in the molded article;
it needs to clean and remove the release agent, because there is no release agent on the surface of the molded core;
the productivity can be remarkably improved and it is possible to largely reduce energy loss caused by heating and cooling, because the molded article does not adhere to the upper mold during opening of the mold, and it is possible to exclude the cooling step for the purpose of assisting releasing of the article; and
it is possible to reduce the loss of manufacturing time, because when the release layer is deteriorated and deformed, it is possible to detach and exchange only the half mold. Therefore, the method of making the golf ball can have good workability and excellent productivity.

DETAILED DESCRIPTION OF THE PREFERRED EMBODIMENTS

Figure 1:
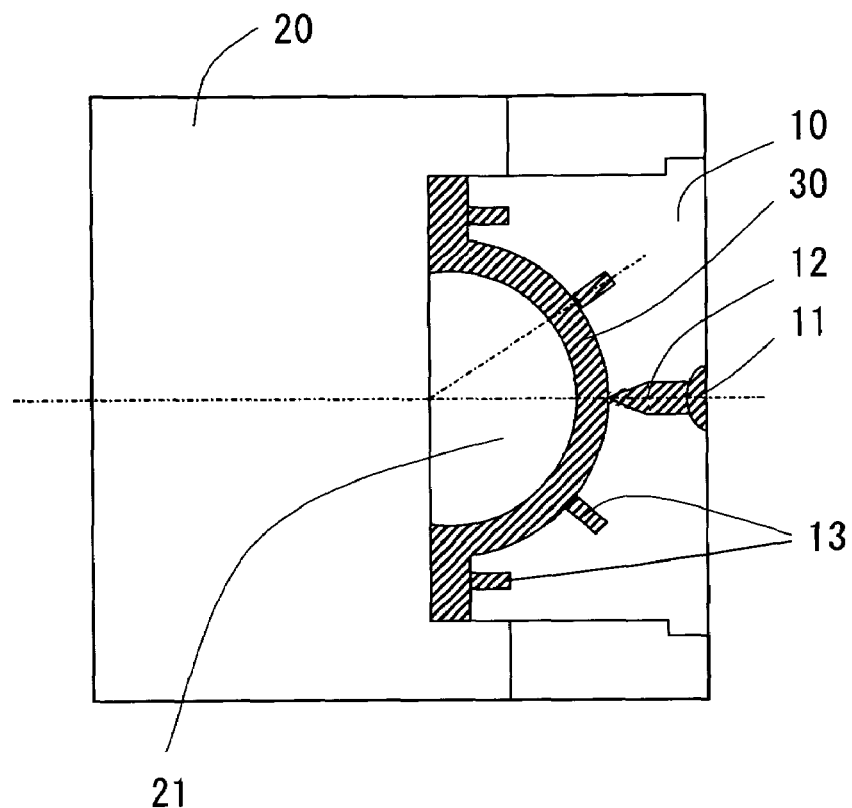
FIG. 1 is a schematic cross section illustrating one embodiment of an injection molding mold for forming the fluoroplastic thin film on the surface of the core half mold of the core mold used for the method of making the golf ball of the present invention.
Figure 2:
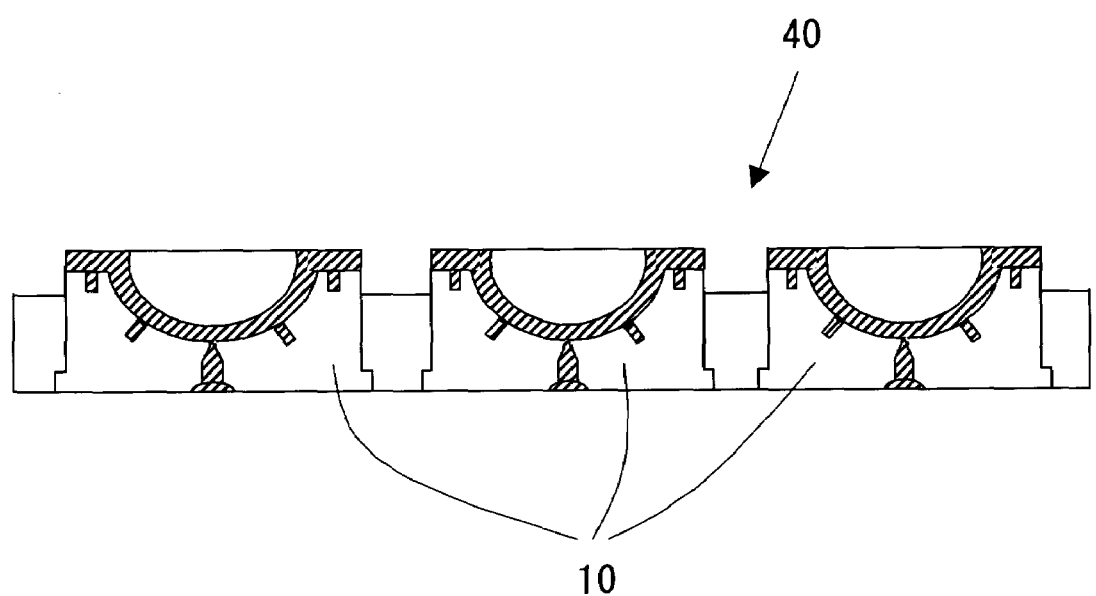
FIG. 2 is a schematic cross section illustrating one embodiment of the core mold used for the method of making the golf ball of the present invention.

The method of making the golf ball of the present invention will be explained with reference to the accompanying drawings. FIG. 1 is a schematic cross section illustrating one embodiment of an injection molding mold for forming the fluoroplastic thin film on the surface of the core half mold of the core mold used for the method of making the golf ball of the present invention. FIG. 2 is a schematic cross section illustrating one embodiment of the core mold used for the method of making the golf ball of the present invention. The method of making the golf ball of the present invention is roughly consisted of two steps of:
(a) forming the core, and
(b) covering the cover on the core. In the method of making the golf ball of the present invention, the step (a) is particularly a distinguishing feature. The step (a) is roughly consisted of four steps of:
(i) clamping a half mold 10 having a semi-spherical cavity and a male plug mold 20 having a semi-spherical convex 21, followed by injection molding fluoroplastic from an inlet vent 11 at the back of the half mold through a runner 12 to form a fluoroplastic thin film 30 on the surface of the half mold,
(ii) incorporating a pair of the two half molds 25 having the fluoroplastic thin film, which is composed of an upper mold and a lower mold, into a core mold 40,
(iii) placing a core composition in the cavity, and
(iv) press molding the core composition in the core mold through the fluoroplastic thin film to form a spherical core.

In the step (a-i), a half mold having a semi-spherical cavity and a male plug mold having a semi-spherical convex, which have been conventionally used as the molds for molding a half-shell for a cover or intermediate layer, are used as a injection molding mold, that is, the half mold 10 is set as the injection molding mold, and then fluoroplastic is injection molded from an inlet vent 11 at the back of the half mold through a runner 12 to form a fluoroplastic thin film 30 on the surface of the half mold 10.

In the method of making the golf ball of the present invention, examples of fluoroplastics used for the fluoroplastic thin film 30 include tetrafluoroethylene-perfluorovinylether copolymer (PFA), polytetrafluoroethylene resin (PTFE), tetrafluoroethylene-hexafluoropropylene copolymer (FEP), polychlorotrifluoroethylene resin (PCTFE) and the like. Concrete examples of the fluoroplastics include fluoroplastics commercially available from Daikin Industries, Ltd. under the trade name of "Neoflon PFA (melting point: 310° C.)", "Polyflon PTFE (melting point: 327° C.)", "Neoflon FEP (melting point: 270° C.)", "Neoflon PCTFE (melting point: 212° C.)" and the like.

It is desired for the fluoroplastic thin film 30 as a releasing layer formed on the surface of the half mold to have a thickness of 0.01 to 3.00 mm. Since the fluoroplastic has low thermal conductivity (0.25 W/(m·K)), the core molding time is long when the fluoroplastic has large thickness. In addition, since the fluoroplastic thin film has low hot strength and is deformed by expansion pressure at the time of molding the core, the fluoroplastic thin film is preferably formed as thin as possible. Therefore, it is desired for the upper limit of the thickness of the fluoroplastic thin film 30 to be not more than 2.0 mm, preferably not more than 1.0 mm in view of thermal conductivity and deformation under applied heating. When the thickness of the fluoroplastic thin film is too small, it is difficult to mold. Therefore, it is desired for the lower limit of the thickness of the fluoroplastic thin film to be not less than 0.03 mm, preferably not less than 0.05 mm in view of moldability.

In the half mold 10, in order to prevent heat from absorbing from the nozzle head of the injection molding machine to the mold and restrain the leakage of the fluoroplastic, the nozzle head preferably has a spherical shape and a larger curvature than the inlet vent, that is, the nozzle touch. The fluoroplastic thin film is formed on the whole surface of the half mold including an inner wall of the semi-spherical cavity.

Since the fluoroplastic thin film 30 does not also adhere to the half mold, the runner 12 preferably has a constriction and the half mold preferably has an anchor hole 13 for the fluoroplastic thin film on the surface of the cavity in order to prevent the fluoroplastic thin film from coming off the cavity when the core is removed from the mold after molding. The phrase "the runner has a constriction" means that the sectional area of the runner is the maximum value at the inlet vent of the half mold and is small at an inlet vent of the cavity. In addition, it is desired for the number of the anchor hole 13 to be within the range of 2 to 10, preferably 4 to 8. When the number of the anchor hole is too large, the strength of the mold is degraded, or the heating of the mold is not uniform.

Since the fluoroplastic thin film 30 does not adhere to the half mold as described above, when it is decomposed and deformed after using long-term use thereof, the thin film can be easily removed from the half mold and new fluoroplastic thin film can be formed by injection molding again.

The fluoroplastic having excellent releasability and excellent heat resistance used in the method of the present invention can be perpetually used in case of forming the fluoroplastic thin film, if it is not deformed after using.

The fluoroplastic has a large linear expansion coefficient ($4.5 \times 10^{-5}$/° C. to $12.0 \times 10^{-5}$/° C.), but it does not come off the surface of the half mold by the constriction of the runner and the anchor hole in the cavity, even if the cooling step is conducted after molding for the purpose of assisting the releasing of the article in the practice of the present invention.

In the step (a-ii), the half mold 10 having the fluoroplastic thin film formed in the step (a-i) is incorporated into the core mold 40 as shown in FIG. 2. In FIG. 2, a three half mold is shown, but it is not limited thereto, as another multi-cavity mold could also be used. In FIG. 2, the lower mold is only shown, but it is the core mold 40, which is composed of the upper mold and the lower mold. The half mold 10 having the fluoroplastic thin film formed in the step (a-i) is placed in all of the cavity portions of the core mold 40. Therefore, when the fluoroplastic thin film 30 is decomposed and deformed after long-term use thereof as described above, it is possible to continue the preparation of the core by exchanging only the corresponding half mold for a spare half mold having new fluoroplastic thin film, and it is possible to restrain the degradation of productivity to a large extent.

The core composition used in the step (a-iii) basically contains a base rubber, a crosslinking agent, a co-crosslinking agent, a filler, optionally an antioxidant and the like. The base rubber used for the core of the present invention may be natural rubber, synthetic rubber or mixtures thereof, which has been conventionally used for solid golf balls. Examples of the synthetic rubbers include polybutadiene rubber, polyisoprene rubber, styrene-butadiene rubber, ethylene-propylene-diene rubber (EPDM) and the like. Particularly preferred is high-cis polybutadiene rubber containing a cis-1,4 bond of not less than 40%, preferably not less than 80%. Moreover, in the present invention, it is desired that the amount of the polybutadiene rubber be not less than 60% by weight, based on the total weight of the base rubber, in view of the rebound characteristics of the resulting golf ball.

As the crosslinking agent for the core, organic peroxides, such as include dicumyl peroxide, 1,1-bis(t-butylperoxy)-3,3,5-trimethylcyclohexane, 2,5-dimethyl-2,5-di(t-butylperoxy)-hexane, di-t-butyl peroxide and the like are suitably used. The preferred organic peroxide is dicumyl peroxide. The amount of the organic peroxide is from 0.5 to 5.0 parts by weight, based on 100 parts by weight of the base rubber. When the amount of the organic peroxide is smaller than 0.5 parts by weight, the core is too soft, and the rebound characteristics are degraded, which reduces the flight distance of the resulting golf ball. On the other hand, when the amount of the organic peroxide is larger than 5.0 parts by weight, the core is too hard, and the shot feel is poor.

Examples of the co-crosslinking agents include a metal salt of α,β-ethylenically unsaturated carboxylic acid, particularly mono- or di-valent metal salts, such as zinc or magnesium salts of α,β-ethylenically unsaturated carboxylic acids having 3 to 8 carbon atoms (e.g. acrylic acid, methacrylic acid, etc.). The preferred co-crosslinking agent is zinc acrylate because it imparts high rebound characteristics to the resulting golf ball. The amount of the co-crosslinking agent may be 15 to 50 parts by weight, preferably 20 to 35 parts by weight, based on 100 parts by weight of the base rubber. When the amount of the co-crosslinking agent is larger than 50 parts by weight, the core is too hard, and the shot feel of the resulting golf ball is poor. On the other hand, when the amount of the co-crosslinking agent is smaller than 15 parts by weight, the core is too soft, and the rebound characteristics are degraded, which reduces the flight distance.

The filler may be one that can be typically used for a core of golf balls, but examples thereof include for example, inorganic filler (such as zinc oxide, barium sulfate, calcium carbonate, and the like), high specific gravity metal powder filler (such as tungsten powder, molybdenum powder, and the like), and the mixture thereof. The amount of the filler, which can vary depending to the specific gravity, size and the like of the cover and center, is not limited, but is from 10 to 100 parts by weight, preferably 10 to 40 parts by weight, based on 100 parts by weight of the base rubber. When the amount of the filler is smaller than 10 parts by weight, the core is too light, and the weight of the resulting golf ball is too small. On the other hand, when the amount of the filler is larger than 100 parts by weight, the core is too heavy, and the weight of the resulting golf ball is too large.

In the golf ball of the present invention, the rubber composition for the core can contain other components, which have been conventionally used for preparing a core of solid golf balls, such as an antioxidant or peptizing agent. If used, the amount of the antioxidant is preferably 0.1 to 3.0 parts by weight, based on 100 parts by weight of the base rubber.

The core composition used in the method of the present invention is obtained by mixing the above components using a proper mixer such as a mixing roll.

In the step (a-iv), the core composition is press-molded in the core mold through the fluoroplastic thin film at 140 to 170° C. and 90 to 120 kgf/cm$^2$ for 10 to 40 minutes to form a spherical core.

Since the fluoroplastic thin film 30 does not adhere to the half mold as described above, the thermal conductivity is degraded by the presence of an air layer, in addition to low thermal conductivity of the fluoroplastic. However, it is improved by putting the rubber composition for the core (plug) in the core mold and cramping the mold to press the fluoroplastic thin film against the cavity.

It is suitable for the core to have a diameter of 10 to 42 mm, preferably 20 to 42 mm, more preferably 30 to 42 mm.

In the method of making the golf ball of the present invention, the cover is covered on the core (in the step (b)). The cover may have a single-layered structure or multi-layered structure, which has two or more layers. As the cover material, thermoplastic resins, particularly ionomer resin, which is a copolymer of α-olefin and α,β-unsaturated carboxylic acid having 3 to 8 carbon atoms, of which a portion of carboxylic acid groups is neutralized with metal ion, polyester, nylon and the like, or mixtures thereof can be used. Examples of the α-olefins in the ionomer preferably include ethylene, propylene and the like. Examples of the α,β-unsaturated carboxylic acid in the ionomer include acrylic acid, methacrylic acid and the like. Examples of the metal ion, which neutralizes a portion of carboxylic acid groups of the copolymer or terpolymer, include an alkali metal ion, such as a sodium ion, a potassium ion, a lithium ion and the like; a divalent metal ion, such as a zinc ion, a calcium ion, a magnesium ion and the like; a trivalent metal ion, such as an aluminum and the like; and mixtures thereof. Preferred are sodium ions, zinc ions, lithium ions and the like, in view of rebound characteristics, durability and the like. The ionomer resin is not limited, but examples thereof will be shown by a trade name thereof. Examples of the ionomer resins, which are commercially available from Du Pont Co., include Surlyn AD8541, Surlyn AD8542 and the like. Examples of the ionomer resins, which are commercially available from Du Pont-Mitsui Polychemicals Co., Ltd. include Hi-milan 1557, Hi-milan 1605, Hi-milan 1652, Hi-milan 1705, Hi-milan 1706, Hi-milan 1707, Hi-milan 1855, Hi-milan 1856 and the like. Examples of the ionomer resins, which are commercially available from Exxon Chemical Co., include Iotek 7010, Iotek 8000 and the like. These ionomer resins may be used alone or in combination.

The cover composition used in the present invention may optionally contain fillers (such as barium sulfate, etc.), pigments (such as titanium dioxide, etc.) and the other additives such as a dispersant, an antioxidant, a UV absorber, a photostabilizer and a fluorescent agent or a fluorescent brightener, etc., in addition to the base resin as a main component as long as the addition of the additives does not deteriorate the desired performance of the golf ball cover. If used, the amount of the pigment is preferably 0.1 to 5.0 parts by weight, based on 100 parts by weight of the base resin for the cover.

A method of covering the core with the cover is not specifically limited, but may be a conventional method. For example, there can be used a method comprising molding the cover composition into a semi-spherical half-shell in advance, covering the core with the two half-shells, followed by press molding at 130 to 170° C. for 1 to 15 minutes, or a method comprising injection molding the cover composition directly on the core, which is covered with the cover, to cover it.

It is desired for the cover to have a thickness of 0.5 to 5.0 mm, preferably 1.0 to 4.0 mm. When the thickness is smaller than 0.5 mm, the hardness of the whole golf ball is low, and the rebound characteristics of the resulting golf ball are degraded. On the other hand, when the thickness is larger than 5.0 mm, the hardness of the whole golf ball is high, and the controllability and shot feel of the resulting golf ball are degraded.

At the time of molding the cover, many depressions called "dimples" are formed on the surface of the golf ball. Furthermore, paint finishing or marking with a stamp may be optionally provided after the cover is molded for commercial purposes.

EXAMPLES

The following Examples and Comparative Examples further illustrate the present invention in detail but are not to be construed to limit the scope of the present invention.

Formation of Releasing Layer

Examples 1 to 8 and Comparative Example 2

A half mold 10 having a semi-spherical cavity and a male plug mold 20 having a semi-spherical convex 21 shown in FIG. 1 were clamped, and then the thin film materials shown in Tables 3 and 4 were injection molded from an inlet vent 11 at the back of the half mold through a runner 12 to form a releasing layer 30 having the thickness shown in the same Tables on the surface of the half mold. With respect to the thin films used, the continuous use temperature was measured, and the results are shown in the same Tables.

Comparative Example 1

The fluorinated mold release agent shown in Table 4 was coated on the surface of the half mold 10 having a semi-spherical cavity, and then baked at 130° C. for 1 minute.

Comparative Example 3

The half mold 10 having a semi-spherical cavity was not treated with a release agent.

Preparation of Core

Examples 1 to 8 and Comparative Examples 1 to 3

A pair of the two half molds having the releasing layer or not, which is composed of an upper mold and a lower mold, was incorporated into a core mold 40 having four cavities. The core rubber compositions having the formulation shown in Table 1 were mixed to form plugs for the core. The plug was placed in the cavity, and press molded at 150° C. for 20 minutes to obtain a core having a diameter of 38.5 to 39.5 mm. The releasability during continuous molding of the resulting core was evaluated by conducting the step of preparing the core described above repeatedly. The results are shown in Tables 3 and 4. The test methods are described later.

TABLE 1

| Core composition | Amount (parts by weight) |
| --- | --- |
| BR-01 *1 | 100 |
| Zinc acrylate *2 | 33 |
| Zinc oxide *3 | 12 |
| Dicumyl peroxide *4 | 1 |
| Diphenyl disulfide *5 | 0.5 |

*1 High-cis polybutadiene, commercially available from JSR Co., Ltd.
*2 Zinc acrylate, commercially available from Nihon Jyoryu Kogyo Co., Ltd. under the trade name of "ZNDS-90S"
*3 Zinc oxide, commercially available from Toho Zinc Co. Ltd.
*4 Dicumyl peroxide, commercially available from Nippon Oil & Fats Co., Ltd. under the trade name of "Percumyl D"
*5 Diphenyl disulfide, commercially available from Sumitomo Seika Chemicals Co., Ltd.

(Formation of Cover)

The formulation materials for the cover showed in Table 2 and 3 were mixed using a kneading type twin-screw extruder to obtain pelletized cover composition. The extrusion condition was, a screw diameter of 45 mm, a screw speed of 200 rpm, and a screw L/D of 35.

The formulation materials were heated at 220 to 260° C. at the die position of the extruder. The resulting cover composition was covered on the core by injection molding to form a cover layer. Then, paint was coated on the surface of the cover layer to obtain a solid golf ball having a diameter of 42.7 mm.

TABLE 2

| Cover composition | Amount (parts by weight) |
| --- | --- |
| Hi-milan 1605 *6 | 50 |
| Hi-milan 1706 *7 | 50 |
| Titanium dioxide | 2 |

*6 Hi-milan 1605 (trade name), ethylene-methacrylic acid copolymer ionomer resin obtained by neutralizing with sodium ion, manufactured by Du Pont-Mitsui Polychemicals Co., Ltd.
*7 Hi-milan 1706 (trade name), ethylene-methacrylic acid copolymer ionomer resin obtained by neutralizing with zinc ion, manufactured by Du Pont-Mitsui Polychemicals Co., Ltd.

(Test Methods)

(1) Continuous Use Temperature

The continuous use temperature was determined by measuring the critical temperature such that the shape of the material does not deform with heating the material at normal pressure.

(2) Releasability During Continuous Molding

The step of press molding the core composition in the core mold, which the releasing layer was formed thereon, to form a spherical core, was repeatedly conducted. The releasability during continuous molding is the number of the press molding until the core is not released from the core mold, and is indicated by an index when that of Example 8 is 100. The larger the index is, the better releasability during continuous molding the releasing layer has.

(Test Results)

TABLE 3

| | Example No. | | | | | |
| --- | --- | --- | --- | --- | --- | --- |
| | 1 | 2 | 3 | 4 | 5 | 6 |
| Thin film material | PFA | PFA | PFA | PFA | PFA | PFA |
| Thin film thickness (mm) | 0.03 | 0.1 | 0.5 | 1.0 | 2.0 | 3.5 |
| Continuous use temperature (° C.) | 260 | 260 | 260 | 260 | 260 | 260 |
| Releasability during continuous molding | 110 | 115 | 122 | 123 | 118 | 80 |

TABLE 4

| | Example No. | | Comparative Example No. | | |
| --- | --- | --- | --- | --- | --- |
| | 7 | 8 | 1 | 2 | 3 |
| Thin film material | PTFE | FEP | FR | PR | — |
| Thin film thickness (mm) | 0.5 | 0.5 | 0.1 | 0.5 | — |
| Continuous use temperature (° C.) | 260 | 200 | — | 120 | — |
| Releasability during continuous molding | 120 | 100 | 10 | 50 | 1 |

PFA: Tetrafluoroethylene-perfluorovinylether copolymer, commercially available from Daikin Industries, Ltd. under the trade name of "Neoflon PFA"
PTFE: Tetrafluoroethylene resin, commercially available from Daikin Industries, Ltd. under the trade name of "Polyflon PTFE"
FEP: Tetrafluoroethylene-hexafluoropropylene copolymer, commercially available from Daikin Industries, Ltd. under the trade name of "Neoflon FEP"
FR: Fluorinated mold release agent, commercially available from Neos Co., Ltd,. under the trade name of "Frelease"
PR: Polyester resin, commercially available from Toyobo Co., Ltd. under the trade name of "Toyobo Ester"

As is apparent from Tables 3 and 4, the methods of making the golf balls of Examples 1 to 8 of the present invention, when compared with the methods of making the golf balls of Comparative Examples 1 to 3, had very excellent releasability during continuous molding of the core mold, and had good workability and excellent productivity.

On the other hand, in the method of making the golf ball of Comparative Example 1, the fluorinated mold release agent was baked on the surface of the cavity of the core mold, but the release agent was adhered to the core surface and removed from the cavity during repeatedly molding the core. Therefore, the releasability during continuous molding is very poor.

In the method of making the golf ball of Comparative Example 2, since the releasing layer described in Examples was placed on the surface of the cavity of the core mold, the performance is better than that of Comparative Example 1. However, since polyester resin was used as the releasing layer, the continuous use temperature is very low, and the releasability during continuous molding is very poor.

In the method of making the golf ball of Comparative Example 3, since the cavity of the core mold had no releasing treatment, the core is not released after molding one time.

What is claimed is:

1. A method of making a golf ball comprising a core and a cover covering the core, the method comprising the steps of:

(a) (i) clamping a half mold having a semi-spherical cavity and a male plug mold having a semi-spherical convex, followed by injection molding fluoroplastic from an inlet vent at the back of the half mold through a runner to form a fluoroplastic thin film on the surface of the half mold,
(ii) incorporating a pair of the two half molds having the fluoroplastic thin film, which is composed of an upper mold and a lower mold, into a core mold,
(iii) placing a core composition in the cavity,
(iv) press molding the core composition in the core mold through the fluoroplastic thin film to form a spherical core, and
(b) covering the core with a cover.

2. The method according to claim 1, wherein the fluoroplastic is polytetrafluoroethylene resin and/or the derivative thereof.

3. The method according to claim 1, wherein the runner has a constriction and the half mold has an anchor hole for the fluoroplastic thin film on the surface thereof in order to prevent the fluoroplastic thin film from coming off the half mold in the step (a).

4. The method according to claim 1, wherein the fluoroplastic thin film has a thickness of 0.01 to 3.00 mm.

* * * * *